United States Patent
Leuschke et al.

(12) 
(10) Patent No.: US 6,454,075 B1
(45) Date of Patent: Sep. 24, 2002

(54) DEVICE FOR ACTUATING A CLUTCH, IN PARTICULAR FOR MOTOR VEHICLES

(75) Inventors: Rainer Leuschke, South Lyon, MI (US); Egid Macht, München (DE)

(73) Assignee: FTE Automotive GmbH, Ebern (DE)

( * ) Notice: Subject to any disclaimer, the term of this patent is extended or adjusted under 35 U.S.C. 154(b) by 5 days.

(21) Appl. No.: 09/614,296

(22) Filed: Jul. 12, 2000

(30) Foreign Application Priority Data

Jul. 21, 1999 (DE) .......................... 199 34 238

(51) Int. Cl.⁷ .......................... G05G 1/14; B60K 23/02
(52) U.S. Cl. .................. 192/99 S; 192/85 C; 74/512; 74/518
(58) Field of Search .................. 192/85 R, 85 C, 192/99 R, 99 S; 74/512, 518

(56) References Cited

U.S. PATENT DOCUMENTS

| | | | |
|---|---|---|---|
| 3,430,512 A | | 3/1969 | Wössner |
| 4,319,497 A | * | 3/1982 | Shinto et al. .................. 74/512 |
| 4,624,152 A | * | 11/1986 | Stotz et al. .................... 74/518 |
| 4,800,774 A | * | 1/1989 | Hagiwara et al. ............. 74/512 |
| 4,907,468 A | * | 3/1990 | Hagiwara et al. ............. 74/512 |
| 5,038,907 A | * | 8/1991 | Baumann .................. 192/99 S |
| 5,215,176 A | | 6/1993 | Hamann |

FOREIGN PATENT DOCUMENTS

| | | | |
|---|---|---|---|
| DE | 29 23 027 C2 | 2/1985 | |
| DE | 36 36 748 C1 | 5/1987 | |
| DE | 38 41 719 C2 | 11/1991 | |
| DE | 43 26 183 A1 | 2/1994 | |
| DE | 44 35 260 A1 | 4/1995 | |
| DE | 196 24 605 C1 | 7/1997 | |
| DE | 196 50 577 A1 | 6/1998 | |
| FR | 2787211 | 6/2000 | |
| JP | 55-55022 A | * 4/1980 | .................. 74/512 |
| JP | 56-71631 A | * 6/1981 | ............... 192/99 S |
| JP | 4-4349514 A | * 12/1992 | .................. 74/512 |

* cited by examiner

Primary Examiner—Richard M. Lorence
(74) Attorney, Agent, or Firm—McAndrews, Held & Malloy, Ltd.

(57) ABSTRACT

A device for actuating a clutch, more particularly for motor vehicles, is disclosed, which has an operating lever pivoted on a bearing point, the operating lever being effectively connected to a master cylinder for the production of actuating pressure. The device also has a top dead center spring pivoted on a bearing point, which is articulated with the operating lever is in a position between dead center and an end position it exerts a force on the operating lever in the direction of this end position. According to the invention, both the bearing point for the top dead center spring and also the bearing point for the operating lever are provided on the master cylinder. An actuating device of simple design is thus created which can easily be mounted at the respective place of assembly, for example on the stationary pedal frame of a motor vehicle.

9 Claims, 2 Drawing Sheets

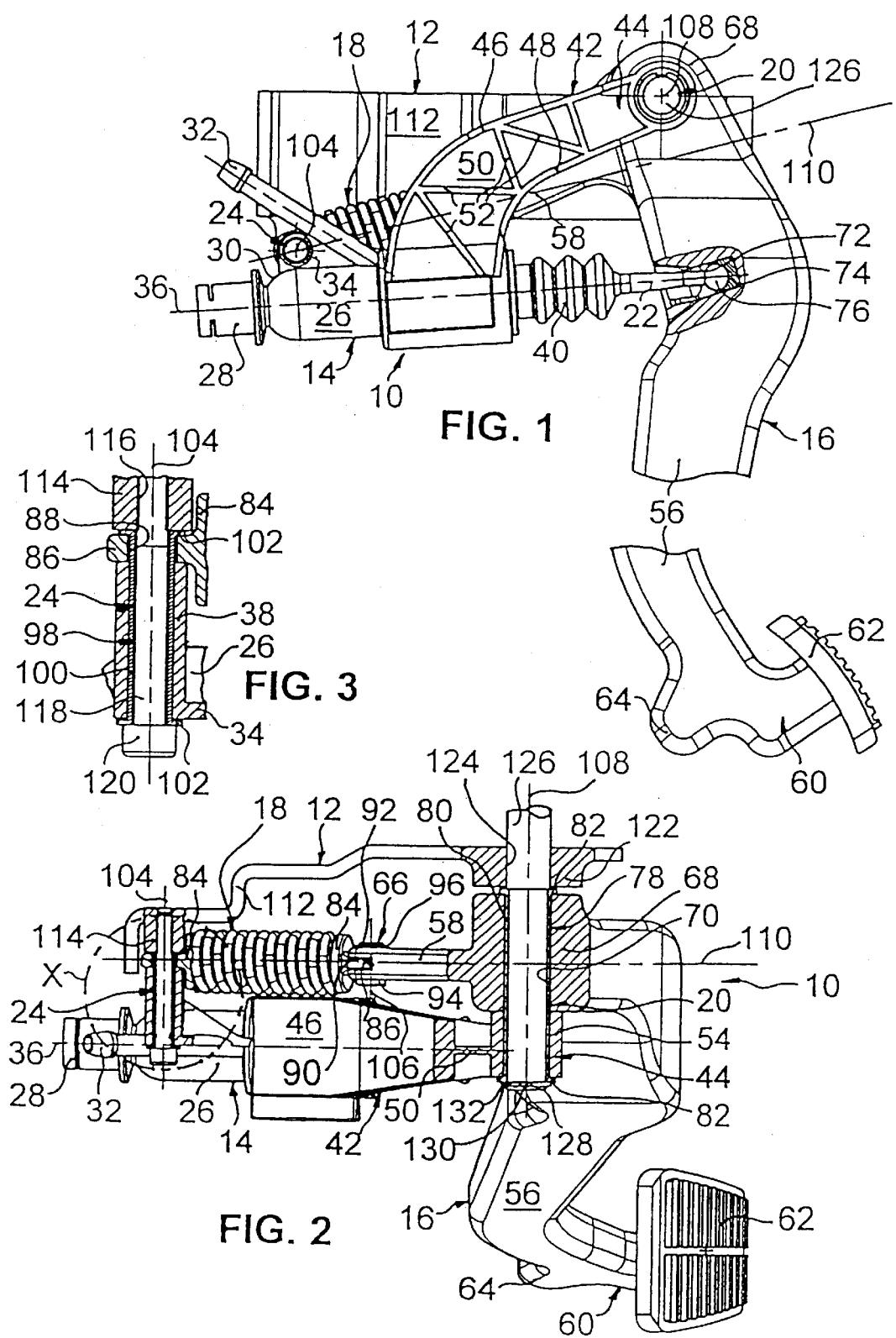

DEVICE FOR ACTUATING A CLUTCH, IN PARTICULAR FOR MOTOR VEHICLES

DESCRIPTION

This invention relates to a device for the actuation of clutch and, in particular, to a device for spring power supported operation of a motor vehicle clutch.

Devices of this kind are known in a variety of forms in prior art and are used in huge quantities the motor industry. With these devices the actuating force to be applied to the clutch pedal for disengaging the clutch, which at the required high contact pressures of clutches on modern high performance engines is correspondingly great, is reduced to a reasonable level by a spring acting upon the clutch pedal.

For example, the printed publications DE 29 23 027 C2, DE 36 36 748 C1, DE 38 41 719 C2, DE 41 10 476 A1, DE 44 35 260 A1, DE 196 50 577 A1 or U.S. Pat. No. 3,430,512 disclose devices for actuating a motor vehicle clutch, which in each case have a pivoted clutch pedal, connected to the piston rod of a hydraulic cylinder in order to create an actuating pressure. The clutch pedal is tiltable between two end settings or positions, of which one corresponds to the engaged condition of the clutch and the other to the disengaged condition. In addition, these devices each have at least one pivoted top dead centre spring installed, articulated with the clutch pedal in such a way that when the clutch pedal is in a position between one dead centre point on the one hand (where the effective line of the top dead centre spring, which also tilts due to its articulation with the clutch pedal when the clutch pedal is tilted, passes through the pivot point of the clutch pedal) and, on the other hand, one of the end positions, it exerts a force on the clutch pedal in the direction of this end position.

In this prior art, both the clutch pedal and the top dead centre spring are pivoted on a pedal frame or a specially-provided frame. A disadvantage of this prior art is that installation of the device on the vehicle is relatively difficult, especially at the beginning of the motor vehicle manufacturer's assembly line.

As compared with the prior art described in the introduction in accordance with, for example, DE 29 23 027 C2, the invention is therefore based upon the problems of creating a simple device for operating a clutch which can easily be mounted at the particular place of assembly—for example on the fixed pedal frame of a motor vehicle.

This problem is solved by the characteristics specified in patent claim 1. Beneficial or appropriate further developments of the invention are the subject of patent claims 2 to 10.

BRIEF SUMMARY OF THE INVENTION

In the case of a device for actuating particularly a motor vehicle clutch which has an operating lever mounted pivoted at a bearing point, the operating lever being effectively connected to a master cylinder for producing an actuating pressure, and which has a top dead centre spring pivoted at another bearing point and connected to the operating lever in such a way that when the operating lever is in a position between a dead centre position and an end position it exerts a force on the operating lever in the direction of this end position, according to the invention both the bearing point for the top dead centre spring and also the other bearing point for the operating lever are provided on the master cylinder.

The top dead centre spring, which is completely pre-assembled and can therefore be installed into the motor vehicle easily and quickly, particularly in the motor vehicle manufacturer's assembly line, but also when retrofitting or replacing, without the use of special tools, e.g., for pre-tensioning the top dead centre spring. The associated benefits in terms of logistics and costs are self-evident.

If the installation or the pre-tensioning of the top dead centre spring is carried out during pre-assembly of the actuating device as described in the invention, during installation of the actuating device in the motor vehicle the parts which move relative to the master cylinder, namely the operating lever and the top dead centre spring, are situated in their respective end positions due to the pre-tensioning of the top dead centre spring, and this corresponds to the engaged or disengaged condition of the clutch when the actuating device is installed, i.e., they are in a specific position relative to one another, which is beneficial in that it favours automated assembly of the securing device in the motor vehicle. If at the same time the pre-tensioned operating lever is in its end position which will later correspond to the disengaged condition of the clutch, the actuating device will be particularly compact for installation, which is an advantage. After installation of the actuating device, the operating lever only has to be pulled back to its start position for filling the hydraulic clutch actuating system, i.e., pulled back to the other end position, which corresponds to the engaged position of the clutch.

A particular advantage of the actuating device as described in the invention also lies in that the pedal frame to be installed in the motor vehicle can be of optimised design regarding its weight, its size and the installation space it requires, as well as its production costs, because all the swivel bearing points needed for the functioning of the actuating device are present on the master cylinder. It is thus possible to design the pedal frame solely for the bearing arrangement of the accelerator pedal and the brake pedal, only simple measures (e.g., suitable bores) being provided for on the pedal frame in order to allow securing of the actuating device described in the invention to the pedal frame. The result is that one and the same pedal frame can be used both for motor vehicles with automatic clutch actuation or automatic gear boxes (clutch pedal not needed) and also for motor vehicles with conventional clutch actuation (clutch pedal needed). With the platform method of construction which is widespread in the motor industry, where in particular the chassis, engine and drive train are identical for various model series, this becomes an even greater advantage.

It is also possible to accommodate the actuating device described in the invention, which is functionally independent, according to the requirements in each particular case, so that it is spatially separated from the pedal frame in the motor vehicle. With the actuating device as defined in the invention, increased spatial flexibility therefore exists, as compared with the prior art described in the introduction. A beneficial accompanying effect here, finally, is also that the pedal frame is eliminated as a system component common to the clutch system and the braking system, so that appropriate mutual harmonisation of these systems, which differ especially with regard to safety requirements, is no longer necessary.

According to certain aspects of an embodiment of the present invention, the bearing point provided for on the master cylinder for the top dead center spring and/or the bearing point provided for on the master cylinder for the operating lever is/are at the same time designed as a securing point, which serves for securing on a pedal frame the pre-assembled composite unit consisting of the master cylinder, the operating lever and the top dead center spring. This design of the actuating device not only reduces the number of parts needed for securing to the pedal frame and the number of securing points for the pedal frame, but also has the advantage, compared with the prior art described above in accordance with DE 36 36 748 C1 or DE 41 10 476 A1, for example, that the securing points are located at pre-determined or defined points on the actuating device, the relative position of which to the master cylinder is completely independent of the relative position of the operating lever or the top dead center spring to the master cylinder. This again considerably simplifies and speeds up installation of the actuating device on the pedal frame, because the operating lever does not first have to be brought into a particular position for this purpose, as was necessary with the prior art cited above. An additional benefit is derived from the fact that the forces applied via the operating lever and by the top dead center spring can be supported in the assembled condition of the actuating device on the pedal frame, allowing the master cylinder housing to be optimized as regards weight, or to be built in lightweight construction, particularly of plastic.

According to certain other aspects of an embodiment of the present invention, the bearing point for the operating lever has a collar sleeve preferably made of metal, the middle section of which passes through a bearing eye provided on the master cylinder housing as well as a bore in the operating lever, and is provided with a ring collar on each of the two sides of its middle section, in order to maintain the swiveling capability of the which penetrates the collar sleeve, and the head of the screw grasps the collar sleeve on the side facing away from the pedal frame, in order to secure the pre-assembled composite unit consisting of the master cylinder, the operating lever and the top dead center spring to the pedal frame.

According to another aspect of an embodiment of the present invention, the bearing point for the operating lever is appropriately designed on a strut formed integral with the master cylinder housing which extends from one of the longitudinal sides of the master cylinder housing, creating in a simple way the required distance between the bearing point around which the operating lever pivots and the point of articulation of the master cylinder piston rod with the operating lever.

According to other aspects of an embodiment of the present invention, the top dead center spring is pivoted on the master cylinder housing, with one end on the longitudinal side of the master cylinder housing, from which the strut extends, and the operating lever is formed as an angle with two legs. The other end of the top dead center spring is articulated with the second leg of the operating lever and the master cylinder is effectively connected by means of its piston rod with the first leg of the operating lever, whilst the operating lever itself is pivoted at the connection point of the leg on the bearing point of the strut. With this design of the actuating device, wherein the operating lever when in the installed position can be arranged essentially parallel with the master cylinder housing or, seen from the direction of the operating lever, can be arranged at the side of the master cylinder, it is an advantage if the actuating device is of particularly flat construction.

Finally, according to an alternative design, the top dead center spring is pivoted on the master cylinder housing, with one end on the longitudinal side of the master cylinder housing facing away from the strut, and the operating lever is formed as an angle with two legs. Here, the other end of the top dead center spring is articulated with the first leg of the operating lever and the master cylinder is effectively connected by means of its piston rod with the operating lever at the connection point of the leg, whilst the operating lever itself is pivoted on the second leg at the bearing point of the strut. With this design of the actuating device, wherein the operating lever can be arranged in the same plane as the master cylinder and the top dead center spring when in the installed position, and when seen from the direction of the operating lever, can be arranged beneath the master cylinder, it is an advantage if the actuating device is of particularly narrow construction. The invention is explained in greater detail below, using preferred embodiments, with reference to the attached drawings.

BRIEF DESCRIPTION OF SEVERAL VIEWS OF THE DRAWINGS

FIG. 1: Which shows a side view of a device as defined in the invention, for operating a motor vehicle clutch, in the neutral or starting position;

FIG. 2: Which shows a top view of the device as in FIG. 1, wherein the places at which the operating lever and the top dead centre spring are pivoted on the master cylinder are shown in an opened-up view;

FIG. 3: Which shows an enlarged view of the detail X in FIG. 2 showing the bearing point between the top dead centre spring and the master cylinder.

DETAILED DESCRIPTION OF THE INVENTION

Figure 4:
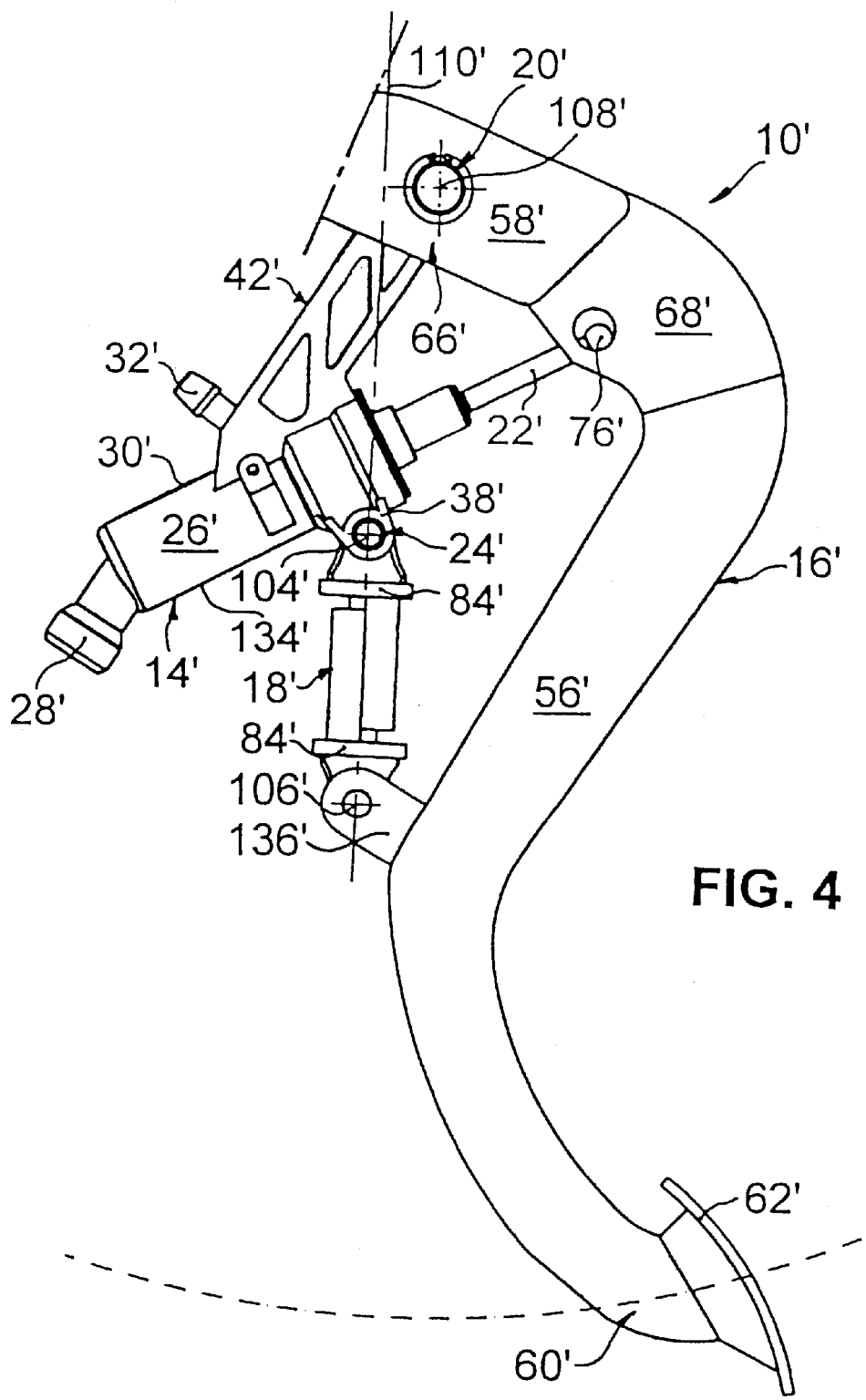
FIG. 4: Which shows a side view of another embodiment of a device as defined in the invention, for operating a motor vehicle clutch, in the neutral or starting position.

In FIGS. 1 and 2 an actuating device 10 for a motor vehicle clutch is shown assembled to a pedal frame 12 in the installed state. The actuating device 10 consists essentially of three components, i.e., a master cylinder 14 and an operating lever, in the embodiment shown a clutch pedal 16, and a top dead centre spring 18. The clutch pedal 16 is pivoted on a bearing point 20 and is effectively connected to the master cylinder 14 via its piston rod 22 in order to produce an actuating pressure. The top dead centre spring 18 is also pivoted at a bearing point 24 and articulated with the clutch pedal 16 in such a way that, when the clutch pedal 16 is in a position between a dead centre position and an end position, it exerts a force on the clutch pedal 16 in the direction of this end position. The two bearing points 20, 24, i.e., both bearing point 20 for the clutch pedal 16 and also bearing point 24 for the top dead centre spring 18, are provided on the master cylinder 14, as described in greater detail below.

The master cylinder 14 has, in a way which is in itself known, a housing 26 made preferably of plastic, in which a piston (not shown) is arranged so that it can be displaced in a longitudinal direction. The piston can be displaced by means of the piston rod 22, in order to create an actuating pressure for disengaging the clutch which, when the actuating device 10 is connected, adjoins a slave cylinder (not shown), via a delivery connection 28 provided on one end of the housing 26. The housing 26 is also provided on its upper longitudinal side 30 in FIG. 1 with an after-run (downstream) or pressure compensation connection 32, which is hydraulically connected to an after-run reservoir (not shown) when the actuating device 10 is attached.

Between the pressure compensation connection 32 and the upper longitudinal side 30 of the housing 26 an essentially triangular web 34 as shown in the side view in FIG. 1 is provided for, which supports the pressure compensation connection 32 against the housing 26. A hollow cylindrical bearing eye 38 running transversely to the longitudinal axis 36 of the master cylinder 14 extends from this web 34, as a component of the bearing point 24 for the top dead centre spring 18, as can be seen particularly in FIG. 3.

The housing 26 is also shown enlarged in cross section between the pressure compensation connection 32 and its right side in FIG. 1, from which projects the piston rod 22 enclosed by a bellows 40. In this area a strut 42 is formed integral with the housing 26, which extends in a curve from the housing 26 starting from the upper longitudinal side 30 of the housing 26 in FIG. 1, wherein its free end 44 runs nearly parallel with the piston rod 22. The strut 42 which, in the top view shown in FIG. 2, tapers from the housing 26 to the free end 44, has essentially an I-shaped cross section with a top flange 46, connected to a bottom flange 48 via a web 50 shown in cross section in FIG. 2. In addition, the strut 42 is reinforced with a number of transverse ribs 52 like a latticework, which are connected to the web 50 and extend between the top flange 46 and the bottom flange 48. Lastly, at the free end 44 the strut 42 has, as part of the bearing point 20 for the clutch pedal 16, a hollow cylindrical bearing eye 54 running transversely to the longitudinal axis 36 of the master cylinder 14, which can be seen clearly in FIG. 2.

The clutch pedal 16 made of plastic or steel sheet is formed as an angle with two legs, 56, 58, which enclose an angle of about 90° as shown in FIG. 1. The lower, first leg 56 in FIG. 1 is provided at its free end 60 on one side with a pedal 62, and on the opposite side with an end stop 64. The upper, second leg 58 in FIG. 1 is shorter and narrower in the crosswise direction than the first leg 56. At the free end 66 of the second leg 58 the top dead centre spring 18 is attached, as described in greater detail below. The connecting section 68 of the legs 56, 58, shown in cross section in FIG. 2, has a transverse bore 70, which is a component of the bearing point 20 of the clutch pedal 16. Finally, the first leg 56 of the clutch pedal 16 is provided with a recess 72 on the side facing the master cylinder 14 between the connecting section 68 and the end stop 64, and is nearer to the connecting section 68. The recess 72 serves for holding a spring element 74, itself known, which, when the actuating device 10 is assembled, fixes a ball head 76 of the piston rod 22 of the master cylinder 14 so that it is resistant to extension and pressure, but is nevertheless pivots on the clutch pedal 16.

The clutch pedal 16, as shown in FIG. 2, is pivoted on its connecting section 68 by means of a preferably metallic collar sleeve 78 on the master cylinder 14 (bearing point 20). The collar sleeve 78 has a hollow cylindrical middle section 80, which passes through both the bearing eye 54 on the strut 42 of the master cylinder 14 and also the transverse bore 70 in the connecting section 68 of the clutch pedal 16. On both sides of the middle section 80 the collar sleeve 78 is provided symmetrically in each case with a ring collar 82, preferably by flanging, which prevents the collar sleeve 78 being pulled out of the bearing eye 54 or the transverse bore 70. In order to ensure easy pivoting of the clutch pedal 16 relative to the master cylinder 14, the collar sleeve 78 can have a slight axial and radial play relative to the bearing eye 54 and the transverse bore 70.

As can be seen especially in FIG. 2, the top dead centre spring 18 is on both sides placed on a spring plate 84 of plastic or metal, each provided with a ledge and circular in cross section. On the side facing away from the ledge each spring plate 84 has a web 86, into which a transverse bore 88 has been inserted. The right spring plate 84 in FIG. 2 is articulated pivoting on the second leg 58 of the clutch pedal 16, for which purpose the web 86 of the spring plate 84 is held with slight play in a slot 90 provided at the free end of the second leg 58, whilst a bearing bolt 92 passes through both the transverse bore 88 of the spring plate 84 and also a transverse bore in the area of the slot 90 at the free end 66 of the second leg 58. The bearing bolt 92, with a head 94 fitted on the end, lies in annular, flat contact with the second leg 58 of the clutch pedal 16 and is held in place by means of a retaining ring 96, which is held in a groove formed at the other end of the bearing bolt 92. The left spring plate 84 in FIG. 2 is also pivoted on its web 86 by means of a preferably metallic collar sleeve 98 on the master cylinder 14 (bearing point 24), which is shown enlarged in FIG. 3. The collar sleeve 98 also has a hollow cylindrical middle section 100, which passes through both the bearing eye 38 on the web 34 of the master cylinder housing 26 and also the transverse bore 88 in the web 86 of the spring plate 84. On both sides of the middle section 100 the collar sleeve 98 is in each case provided symmetrically with a ring collar 102, preferably by flanging, which prevents the collar sleeve 98 being pulled out of the bearing eye 38 or the transverse bore 88. In order to ensure easy pivoting of the top dead centre spring 18 relative to the master cylinder 14, the collar sleeve 98 can also have a slight axial and radial play relative to the bearing eye 38 and the transverse bore 88.

It can be seen from the above description that the top dead centre spring 18 can pivot relative to the master cylinder 14 around the transverse axis 104 of the bearing point 24 on the master cylinder 14 and relative to the clutch pedal 16 around the transverse axis 106 of the bearing bolt 92 on the second leg 58 of the clutch pedal 16. At the same time the clutch pedal 16 can pivot relative to the master cylinder 14 around the transverse axis 108 of the bearing point 20 on the master cylinder 14. Release of this link chain pre-tensioned by the top dead centre spring 18 is prevented by the articulation of the ball head 76 of the piston rod 22 with the spring element 74 which is secured in the recess 72 of the clutch pedal 16. This pre-tensioned link chain which, regardless of its being secured to the pedal frame 12, is in itself self-contained, can now be situated in two end positions, i.e., on the one hand in the end position shown in FIGS. 1 and 2, which, when the actuating device 10 is installed, corresponds to the engaged position of the clutch (piston rod 22 pulled out of the housing 26) and in which the top dead centre spring 18 on the clutch pedal 16 creates a moment about the bearing point 20 on the master cylinder 14 which is in an anti-clockwise direction in FIG. 1 and, on the other hand, in an end position in which the top dead centre spring 18 on the clutch pedal 16 creates a moment about the bearing point 20 on the master cylinder 14 which is in a clockwise direction in FIG. 1, and which, when the actuating device 10 is installed, corresponds to the disengaged position of the clutch (piston rod 22 pushed into the housing 26). If, in other words, the clutch pedal 16, starting from the end position shown in FIG. 1, is said to pivot about the swivelling axis 108 of the bearing point 20 on the master cylinder 14 in a clockwise direction, the top dead centre spring 18 will initially be compressed until the effective line 110 of the top dead centre spring 18, which goes through the pivot axes 104 and 106 of the top dead centre spring 18, moves through the pivot axis 108 of the bearing point 20 or the three pivot axes 104, 106 and 108 lie in one plane (unstable dead centre position). With further pivoting of the clutch pedal 16 in a clockwise direction the top dead centre spring 18 releases again and at the same time presses the clutch pedal 16 to its other end position. The return of the clutch pedal 16 to its end position shown in FIG. 1 takes place similarly, i.e., initially, when the clutch pedal 16 pivots about the pivot axis 108 of the bearing point 20 in an anti-clockwise direction, the top dead centre spring 18 is compressed until the dead centre position is reached, and then the top dead centre spring 18 presses the clutch pedal 16 into its end position as shown in FIG. 1. It goes without saying that when the actuating device 10 is installed, external forces act upon the actuating device 10, namely on the input side the foot forces introduced via the pedal 62, and on the output side by the spring force of the clutch, which exceeds the spring force of the top dead centre spring 18. The clutch spring force is transferred via the fluid column between the slave cylinder and the master cylinder 14 to the latter, and from there has a retroactive effect upon the clutch pedal 16 via the piston rod 22.

In this connection it should also be mentioned that the top dead centre spring 18 shown and described is obviously a pressure spring. However, a tensile spring can equally well be used as a top dead centre spring according to the respective requirements, as is already known, in principle, from prior art; but since this is associated with higher construction costs, the design of the top dead centre spring as a pressure spring is preferred here.

In the embodiment shown, the articulation between the master cylinder 14 and the clutch pedal 16 (bearing point 20) and the top dead centre spring 18 (bearing point 24) is realised by means of collar sleeves 78 and 98, respectively. However, it is also conceivable that the one part supports the other part, pivoted to it, directly, i.e., mounted without a collar sleeve (not shown); for example, the bearing eye 38 at the upper end in FIG. 3 could be provided with a tapering ledge, which would extend through the transverse bore 88 in the web 86 of the spring plate 84. Here, with the actuating device 10 assembled, the spring plate 84 would then be held pivotable between the shoulder on the ledge of the bearing eye 38 on the one side (bottom) and the pedal frame 12 on the other side (top) with a slight axial play.

In the case of the embodiment described here, the bearing points 20, 24 provided on the master cylinder 14 for the clutch pedal 16 and the top dead centre spring 18 are designed at the same time as securing points which serve for securing the assembled composite unit made up of the master cylinder 14, the clutch pedal 16 and the top dead centre spring 18 on the pedal frame 12, as described in greater detail below.

In FIGS. 1 and 2 only a side panel 112 of the pedal frame 12 mounted on the transverse panel or bulkhead (not shown) of a motor vehicle front section is shown. The side panel 112 as seen in the top view shown in FIG. 2 is multi-angled and has on the two sides in each case a securing point for the pre-assembled composite unit made up of the master cylinder 14, the clutch pedal 16 and the top dead centre spring 18. In the case of the left securing point in FIGS. 1 and 2, this is a cylindrical lug 114, which is preferably welded onto the side panel 112 of the pedal frame 12 and has a central tap 116 as a threaded section, as can be seen especially in FIG. 3. Into the tap 116 a screw 118 is screwed through the collar sleeve 98, the head 120 of which grips the collar sleeve 98 behind on the side facing away from the pedal frame 12, thereby securing the pre-assembled composite unit made up of the master cylinder 14, the clutch pedal 16 and the top dead centre spring 18 to the pedal frame 12. The securing forces introduced via the head 120 of the screw 118 into the lower ring collar 102 of the collar sleeve 98 in FIG. 3 are passed on through the middle section 100 of the collar sleeve 98 and are supported by the upper ring collar 102 on the lug 114 on the pedal frame 12 in FIG. 3. In this way the securing forces applied by the screw 118 in the direction of the transverse axis 104 are released from the bearing eye 38 of the master cylinder 14 and from the spring plate 84 for the top dead centre spring 18, so that they do not prevent pivoting of the top dead centre spring 18 relative to the master cylinder 14. The same effect could be achieved here with a design without a collar sleeve, by means of a bearing screw, the bearing section of which would project over a ledge into the threaded section smaller in diameter; the distance between screw head and ledge to the threaded section, which would create a slight axial play between the parts which are mutually mobile, would be constant.

At the same time the securing forces acting upon the bearing point 24 via the top dead centre spring 18 vertically to the transverse axis 104, are passed via the web 86 of the spring plate 84 into the middle section 100 of the collar sleeve 98, and from there mainly into the lug 114 of the pedal frame 12, so that the plastic housing 26 of the master cylinder 14 is load-relieved, allowing weight-optimised design of the housing 26.

The right securing point in FIGS. 1 and 2 for the pre-assembled composite unit made up of the master cylinder 14, the clutch pedal 16 and the top dead centre spring 18 is shown opened up in FIG. 2. Here, the side panel 112 of the pedal frame 12 has an area 122 reinforced in cross section which is provided with a transverse bore 124, through which a bearing bolt 126 extends. The bearing bolt 126 secured in the pedal frame 12 passes through the collar sleeve 78 of the bearing point 20 and at the side facing away from the pedal frame 12, at its end 128 projecting over the collar sleeve 78, has a retaining ring 132 housed in a groove 130 formed in the bearing bolt 126, to fasten the pre-assembled composite unit made up of the master cylinder 14, the clutch pedal 16 and the top dead centre spring 18 to the pedal frame 12. Here, too, the actuating forces applied to the bearing point 20 via the clutch pedal 16 vertically to the transverse axis 108 are supported by means of the bearing bolt 126 mainly on the pedal frame 12, so that the strut formed on the housing 26 of the master cylinder 14 is not over-stressed. In this connection, the advantage should also be mentioned that the bearing bolt 126 can carry the brake and the accelerator pedal (not shown) at its upper end shown in FIG. 2. One and the same pedal frame can thus be used both for motor vehicles without a clutch pedal and for vehicles with clutch pedals; if a clutch pedal is provided for, only one bearing bolt projecting appropriately from the pedal frame as shown in FIG. 2 needs to be used for the pedal module described above.

Although in the embodiment shown the left securing point in FIGS. 1 and 2 is designed as a threaded connection, whilst the right securing point is a plug-in connection with a retaining ring, these forms of securing are interchangeable to correspond with the requirements in each individual case, or the securing points can be designed in only one way, i.e., only as threaded connections or only as plug-in connections with retaining rings. Two-point securing of the pedal module on the pedal frame is preferable, however, in order reliably to prevent the pedal module twisting when force is applied.

From the description given above it is immediately clear to the specialist that for assembly of the actuating device 10, the pre-assembled composite unit made up of the master cylinder 14, the clutch pedal 16 and the top dead center spring 18 has simply to be placed onto the pedal frame 12 and secured by means of retaining rings or as to be screwed onto the pedal frame, without the need for further assembly stages, for example orientation or alignment of the parts of the actuating device 10 which are mobile relative to one another, or pre-tensioning of the top dead center spring 18. FIG. 4 shows a further embodiment of an actuating device 10', which is not yet mounted on the pedal frame. The parts corresponding to the parts of the embodiment described with reference to FIGS. 1 to 3 are provided with an appropriate reference key. In particular, reference signs 28', 30' and 32' designate a delivery connection, a longitudinal side of a housing 26' and a pressure compensation connection, respectively. The other embodiment is described below only in so far as it differs from the embodiment above.

Whilst in the embodiment described with reference to FIGS. 1 to 3 the top dead centre spring 18, with its left end shown in FIGS. 1 and 2 on the longitudinal side of the master cylinder housing 26 from which the strut 42 extends, is pivoted on the master cylinder housing 26, in the embodiment as shown in FIG. 4 the top dead centre spring 18', which is shown only schematically, is pivoted on the master cylinder housing 26' by means of a spring plate 84', with its upper end shown in FIG. 4 on the longitudinal side 134' of the master cylinder housing 26' facing away from the strut 42'. For this purpose the housing 26' is provided, at its right end in FIG. 4 enlarged in cross section, with a bearing eye 38', which with reference to the longitudinal axis of the master cylinder 14' is arranged offset 180° to the strut 42'.

The clutch pedal 16' has here an essentially U-shaped cross section and is also designed as an angle with two legs 56', 58'. The lower end of the top dead centre spring 18' in FIG. 4 is articulated via a spring plate 84' to a bearing eye 136' articulated with a first leg 56' of the clutch pedal 16'. In the area of the bearing eye 136' the first leg 56' of the clutch pedal 16' is again angled, so that the free end 60' of the first leg 56' provided with the foot plate 62' projects to the right as shown in FIG. 4. The master cylinder 14' is effectively connected by means of its piston rod 22' to the connecting section 68' of the legs 56', 58', whilst the clutch pedal 16' itself is pivoted at the free end 66' of the shorter second leg 58' at the bearing point 20' of the strut 42', and at the same time the clutch pedal 16' encompasses the strut 42' with its U-shaped cross section. In the case of this embodiment also, the top dead centre spring 18' can pivot relative to the master cylinder 14' around the transverse axis 104' of the bearing point 24' on the bearing eye 38' of the master cylinder 14', and relative to the clutch pedal 16' around the transverse axis 106' on the bearing eye 136' of the first leg 56' of the clutch pedal 16'. At the same time the clutch pedal 16' can pivot relative to the master cylinder 14' around the transverse axis 108' of the bearing point 20' on the strut 42' of the master cylinder 14'. Releasing of this link chain pre-tensioned by the top dead centre spring 18' is also prevented by the articulation of the ball head 76' of the piston rod 22' with the connecting section 68' of the clutch pedal 16'. Regarding this connection and the design of the swivel bearing between the three components, the master cylinder 14', the clutch pedal 16' and the top dead centre spring 18', at this point reference can be made to the description relating to FIGS. 1 to 3, in order to avoid repetition. The connection of this actuating device 10' to a pedal frame (not shown) via the bearing points 20' and 24' can be made in the same way as the connection already described.

Whilst the actuating device 10 shown in FIGS. 1 to 3, with its almost parallel arrangement of the top dead centre spring 18 to the housing 26 of the master cylinder 14, is designed to be particularly flat (see FIG. 1), the actuating device 10' as shown in FIG. 4 has the advantage that it is especially narrow, for example as seen in a top view from the right in FIG. 4, because the master cylinder 14', the clutch pedal 16' and the top dead centre spring 18' lie in one plane.

Finally, it should be mentioned in this connection that although in FIG. 2 an arrangement of the clutch pedal 16 and the top dead centre spring 18 shown above the master cylinder housing 26 the clutch pedal 16 and the top dead centre spring 18 can also be arranged, depending upon individual requirements, on the other side facing away from the pedal frame 12, i.e., in FIG. 2 beneath the master cylinder housing 26.

A device for actuating a clutch is disclosed, more particularly for motor vehicles, which has an operating lever pivoted on a bearing point and effectively connected to a master cylinder for creating an actuating pressure. The device also has a top dead centre spring pivoted on a bearing point, which is articulated with the operating lever in such a way that when the operating lever is in a position between a dead centre position and an end position it exerts a force on the operating lever in the direction of this end position. According to the invention both the bearing point for the top dead centre spring and also the bearing point for the operating lever are provided on the master cylinder. An actuating device of simple design is thus created, which can easily be mounted at the place of assembly concerned, for example on the stationary pedal frame of a motor vehicle.

| | Key |
|---|---|
| 10, 10' | Actuating device |
| 12 | Pedal frame |
| 14, 14' | Master cylinder |
| 16, 16' | Clutch pedal |
| 18, 18' | Top dead centre spring |
| 20, 20' | Bearing point |
| 22, 22' | Piston rod |
| 24, 24' | Bearing point |
| 26, 26' | Housing |
| 28, 28' | Delivery connection |
| 30, 30' | Longitudinal side |
| 32, 32' | Pressure compensation connection |
| 34 | Web |
| 36 | Longitudinal axis |
| 38, 38' | Bearing eye |
| 40 | Bellows |
| 42, 42' | Strut |
| 44 | Free end |
| 46 | Top flange |
| 48 | Bottom flange |
| 50 | Web |
| 52 | Transverse rib |
| 54 | Bearing eye |
| 56, 56' | Leg |
| 58, 58' | Leg |
| 60, 60' | Free end |
| 62, 62' | Foot plate |
| 64 | End stop |
| 66, 66' | Free end |
| 68, 68' | Connecting section |
| 70 | Transverse bore |
| 72 | Recess |
| 74 | Spring element |
| 76, 76' | Ball head |
| 78 | Collar sleeve |
| 80 | Middle section |
| 82 | Ring collar |
| 84, 84' | Spring plate |
| 86 | Web |
| 88 | Transverse bore |
| 90 | Slot |
| 92 | Bearing bolt |
| 94 | Head |
| 96 | Retaining ring |
| 98 | Collar sleeve |
| 100 | Middle section |
| 102 | Ring collar |
| 104, 104' | Transverse axis |

-continued

| | Key |
|---|---|
| 106, 106' | Transverse axis |
| 108, 108' | Transverse axis |
| 110, 110' | Effective line |
| 112 | Side panel |
| 114 | Carrier (lug?) |
| 115 | Tap |
| 118 | Screw |
| 120 | Head |
| 122 | Reinforced area |
| 124 | Transverse bore |
| 126 | Bearing bolt |
| 128 | End |
| 130 | Groove |
| 132 | Retaining ring |
| 134' | Longitudinal side |
| 136' | Bearing eye |

What is claimed is:

1. A device for actuating a clutch for motor vehicles, the device having a master cylinder, a bearing point and a tiltable operating lever moveable between a dead center position and an end position and installed at the bearing point, the operating lever being effectively connected with the master cylinder for the creation of an actuating pressure, the device further having a top dead center spring installed tiltably at a bearing point, the spring being connected to the operating lever such that when the operating lever is in a position between the dead center position and the end position the spring exercises a force on the operating lever in the direction of its end position, wherein both the bearing point for the top dead center spring and the bearing point for the operating lever are provided on the master cylinder such that the top dead center spring and the operating lever are movable relative to the master cylinder, wherein the master cylinder, the operating lever and the top dead center spring comprise a pre-assembled unit and wherein the bearing point provided on the master cylinder for the top dead center spring and the bearing point provided on the master cylinder for the operating lever each are formed as a securing point for securing the pre-assembled unit to a pedal frame.

2. A device according to claim 1, wherein the master cylinder has a housing, and wherein the bearing point for the operating lever has a first metal collar sleeve, the first collar sleeve having a middle section which passes through a bearing eye provided on the housing of the master cylinder as well as a bore formed in the operating lever, and wherein the first collar sleeve is fitted with a ring collar on both sides of its middle section in order to keep tiltable the operating lever on the housing of the master cylinder.

3. A device according to claim 2, wherein the master cylinder, the operating lever and the top dead center spring comprise a pre-assembled unit, and wherein a bearing bolt is fitted to the pedal frame and passes through the first collar sleeve and, at its end projecting over the first collar sleeve, carries a retaining ring on the side facing away from the pedal frame, in order to fasten the pre-assembled unit to the pedal frame.

4. A device according to claim 1, wherein the master cylinder has a housing, and wherein the bearing point for the top dead center spring has a second metal collar sleeve, the second collar sleeve having a middle section which passes through a bearing eye provided on the housing of the master cylinder as well as a bore formed in a spring plate for the top dead center spring, and wherein the second collar sleeve is fitted on both sides of its middle section with a ring collar in order to keep tiltable the spring plate for the top dead center spring on the housing of the master cylinder.

5. A device according to claim 4, wherein the master cylinder, the operating lever and the top dead center spring comprise a pre-assembled unit, and wherein the pedal frame has a threaded section into which is screwed a headed screw which penetrates the second collar sleeve, the head of the screw grasps the second collar sleeve on the side facing away from the pedal frame, in order to fasten the pre-assembled unit to the pedal frame.

6. A device according to claim 1, wherein the master cylinder has a housing, and wherein the bearing point for the operating lever is designed on a strut integrally formed with the housing of the master cylinder and which extends from one of the longitudinal sides of the master cylinder housing.

7. A device according to claim 6, wherein the master cylinder has a piston rod, and wherein the top dead center spring is installed tiltably on the master cylinder housing, with one end on the longitudinal side of the master cylinder housing, from which the strut extends, and the operating lever is formed as an angle with two legs, the other end of the top dead center spring is connected to the second leg of the operating lever and the master cylinder is effectively connected by the piston rod with the first leg of the operating lever, while the operating lever itself is installed tiltably at the connection point of the leg at the bearing point of the strut.

8. A device according to claim 6, wherein the top dead center spring is installed tiltably on the master cylinder housing, with one end on the longitudinal side of the master cylinder housing facing away from the strut, and the operating lever is formed as an angle with two legs, the other end of the top dead center spring is connected to the first leg of the operating lever and the master cylinder is effectively connected by its piston rod with the operating lever at the connection point of the legs, while the operating lever itself is installed tiltably on bearings on the second leg at the bearing point of the strut.

9. A device according to claim 1, wherein the master cylinder has a housing, and wherein the housing of the master cylinder consists of plastic.

* * * * *